(12) United States Patent
Shimomura et al.

(10) Patent No.: US 8,418,438 B2
(45) Date of Patent: Apr. 16, 2013

(54) EXHAUST GAS PURIFYING DEVICE FOR INTERNAL COMBUSTION ENGINE

(75) Inventors: Osamu Shimomura, Okazaki (JP);
Masakazu Sakata, Oobu (JP);
Masatoshi Maruyama, Nagoya (JP);
Kazuharu Tochikawa, Aichi-gun (JP)

(73) Assignee: Denso Corporation, Kariya (JP)

( * ) Notice: Subject to any disclaimer, the term of this patent is extended or adjusted under 35 U.S.C. 154(b) by 444 days.

(21) Appl. No.: 12/758,999

(22) Filed: Apr. 13, 2010

(65) Prior Publication Data
US 2010/0257844 A1 Oct. 14, 2010

(30) Foreign Application Priority Data
Apr. 14, 2009 (JP) ................... 2009-097886

(51) Int. Cl.
*F01N 3/00* (2006.01)
(52) U.S. Cl.
USPC ............... 60/277; 60/295; 60/299; 60/301
(58) Field of Classification Search ......... 60/274, 60/285–287, 295–301
See application file for complete search history.

(56) References Cited

U.S. PATENT DOCUMENTS

| 6,755,014 B2 | 6/2004 | Kawai et al. |
| 2008/0034732 A1 | 2/2008 | Hosoya et al. |
| 2009/0013666 A1* | 1/2009 | Jung .............................. 60/277 |
| 2010/0031633 A1* | 2/2010 | Kitazawa ........................ 60/276 |
| 2010/0115918 A1* | 5/2010 | Sawada et al. .................. 60/276 |
| 2010/0218487 A1* | 9/2010 | Wang et al. ..................... 60/287 |
| 2011/0000290 A1* | 1/2011 | Sawada et al. ............. 73/114.75 |

FOREIGN PATENT DOCUMENTS

| JP | 2003-293737 | 10/2003 |
| JP | 2003-293738 | 10/2003 |
| JP | 2003-293739 | 10/2003 |
| JP | 2003-293743 | 10/2003 |
| JP | 2006-002663 | 1/2006 |

* cited by examiner

*Primary Examiner* — Thomas Denion
*Assistant Examiner* — Jesse Bogue
(74) *Attorney, Agent, or Firm* — Nixon & Vanderhye PC (57) ABSTRACT

An exhaust gas purifying system for a diesel engine has an ECU, a passage of exhaust gas, a unit having SCR catalyst, a NOx sensor placed at a downstream side of the unit, and a urea water adding valve placed at an upstream side of the unit. The SCR catalyst in the unit selectively adsorbs ammonia, and selectively purifies NOx contained in an exhaust gas emitted from the diesel engine by the adsorbed ammonia. The ECU changes the urea water adding amount, and performs abnormality diagnosis based on the detection result of the NOx sensor while changing an adding amount of the urea water. The ECU uses a first condition to indicate the presence of an excess NOx amount in the exhaust gas, and a second condition to indicate there is no error cause by the ammonia adsorption on the SCR catalyst.

6 Claims, 6 Drawing Sheets

EXHAUST GAS PURIFYING DEVICE FOR INTERNAL COMBUSTION ENGINE

CROSS-REFERENCE TO RELATED APPLICATION

This application is related to and claims priority from Japanese Patent Application No. 2009-97886 filed on Apr. 14, 2009, the contents of which are hereby incorporated by reference.

BACKGROUND OF THE INVENTION

1. Field of the Invention

The present invention relates to an exhaust gas purifying device to be applied to an exhaust gas purifying system for internal combustion engines such as diesel engines. The exhaust gas purifying system is generally comprised of an exhaust gas pipe, a urea water adding valve, an unit having selective catalytic reduction (SCR) capable of selectively purifying nitrogen oxide (NOx) contained in an exhaust gas emitted from the internal combustion engine by using ammonia as a reductant (or a reducing agent), and one or more NOx sensors.

2. Description of the Related Art

There have been developed selective catalytic reduction (SCR) systems, and some of them have been put in practice. Such a SCR system reduces nitrogen oxide (NOx) contained in an exhaust gas emitted from an internal combustion engine (in particular, a diesel engine) mounted to vehicles with a high purifying rate, etc.

In general, such a SCR system is comprised of an exhaust gas pipe, an unit having an NOx catalyst of a selective reduction type, and a valve through which urea water (as reductant solution) is supplied into the exhaust gas which flows in the exhaust gas pipe. The exhaust gas pipe is communicated with a diesel engine. The urea water adding valve is placed at an upstream side of the unit having NOx catalyst of a selective reduction type on the exhaust gas pipe.

when urea water is supplied into the exhaust gas in the exhaust gas pipe through the valve, the urea water is hydrolyzed by the thermal energy of the exhaust gas. The hydrolysis of the urea water generates ammonia ($NH_3$). The generated ammonia and NOx contained in the exhaust gas are reacted together. This selectively reduces NOx contained in the exhaust gas, and the exhaust gas is thereby purified.

In order to increase the NOx purifying rate to purify NOx contained in the exhaust gas by using the NOx catalyst, and to suppress occurrence of ammonia slip in which surplus ammonia generated in NOx reduction reaction remains and is discharged through the exhaust gas pipe, it is necessary to supply an optimum amount of ammonia to the amount of NOx catalyst. In order to achieve this control, the conventional SCR system is equipped with one or more NOx sensors, at least one placed at a downstream side of the unit containing NOx catalyst. Based on a detection signal of the NOx sensor, it is possible to control the opening rate of the valve in order to adjust the amount of urea water, and to diagnose occurrence of an abnormal state in the SCR system.

By the way, there is a special NOx sensor in various types of NOx sensors which are currently available in the market, which is capable of detecting ammonia in addition to NOx. However, it is difficult to specify whether a detection signal of the NOx sensor is generated by the presence of NOx or ammonia. Even if there is a high probability of abnormal state when the NOx sensor placed at a downstream side outputs a detection signal of a large value, it is impossible to determine whether such a large detection signal from the NOx sensor is caused by the occurrence of ammonia slip or the presence of NOx contained in the exhaust gas. Therefore the above type of a NOx sensor cannot specify the cause of generating such abnormal condition, namely, which is caused by the occurrence of ammonia slip or the presence of NOx.

In order to solve such a conventional problem, there has been proposed a conventional technique to detect an occurrence of ammonia slip based on a detection signal of a NOx sensor. (For example, such a conventional technique is disclosed in Japanese patent laid open publication No. JP 2003-293743).

The conventional technique disclosed in JP 2003-293743 increases an adding amount of urea water when an actual NOx purifying rate is lower than a target NOx purifying rate, and judges the occurrence of ammonia slip when the actual NOx purifying rate is not increased Further, when judging the occurrence of ammonia slip, the conventional technique decreases an ammonia adsorption amount on the NOx catalyst in order to prevent the ammonia slip. The conventional technique then judges the SCR system to be in an abnormal state when the NOx purifying rate is not increased according to decreasing the ammonia adsorption amount of NOx catalyst.

When the actual NOx purifying rate is lower than the target NOx purifying rate, it can be considered that ammonia is discharged into the downstream side of the unit of NOx catalyst due to an excess supply of urea water in addition to when the exhaust gas containing NOx is discharged into the downstream side of the unit of NOx catalyst by lacking an adequate amount of urea water. Accordingly, when the amount of urea water is increased when the actual NOx purifying rate is lower than the target NOx purifying rate, this promotes discharging ammonia into the exhaust gas in the exhaust gas pipe. That is, there is a probability of increasing the ammonia slip when the added amount of urea water is forcedly changed without determining whether the increasing of the output value of the NOx sensor placed at the downstream side of the unit having NOx catalyst is caused by ammonia slip or the presence of NOx contained in the exhaust gas.

Accordingly, it is preferable to more decrease the number of processes to execute the abnormality diagnosis while forcedly changing the adding amount of urea water.

In the point of view to improve the accuracy of the abnormality diagnosis, it is preferred to execute the abnormality diagnosis based on the detection signal of the NOx sensor under the condition in which the detection signal of the NOx sensor is free from various types of fluctuations.

SUMMARY OF THE INVENTION

It is an object of the present invention to provide an exhaust gas purifying device to be applied to an exhaust gas purifying system for internal combustion engines such as diesel engines. The exhaust gas purifying device according to the present invention is capable of performing abnormality diagnosis with high accuracy, and avoiding executing the abnormality diagnosis under a condition to cause an incorrect diagnosis.

To achieve the above purposes, the present invention provides an exhaust gas purifying device to be applied to an exhaust gas purifying system for an internal combustion engine. The exhaust gas purifying system is comprised of an exhaust gas passage through which an exhaust gas emitted from the internal combustion engine flows, a unit having NOx catalyst placed in the exhaust gas passage, one or more NOx sensors, one of which is placed at a downstream side of the unit having NOx catalyst, and reductant adding means (or a reductant adding valve) which supplies an adding reductant into the inside of the exhaust gas pipe, and is placed at an upstream side of the unit having NOx catalyst.

In the exhaust gas purifying system, the NOx catalyst is capable of adsorbing the reductant. The reductant is capable of selectively purifying NOx contained in the exhaust gas. The exhaust gas purifying device according to the present invention has a reduction adding amount control means, and an abnormality diagnosis means. The reductant adding amount control means controls a reductant adding amount of the reductant adding means. The abnormality diagnosis means changes the reductant adding amount of the reductant adding amount control means, and performs an abnormality diagnosis based on an output value of the NOx sensor while changing the reductant adding amount. In the exhaust gas purifying device, the abnormality diagnosis means performs the abnormality diagnosis only when a first condition (a) and a second condition (b) are satisfied: (a) the detection result of the NOx sensor indicates occurrence of an excess amount of NOx contained in the exhaust gas, and (b) there is no cause to lead the abnormality diagnosis based on the adsorption of the reductant on the NOx catalyst.

The exhaust gas purifying device detects whether or not ammonia slip occurs or not by monitoring a detection signal of the NOx sensor while forcedly changing an adding amount of the reductant when an excess amount of NOx contained in the exhaust gas is detected based on a detection result of the NOx sensor (when the first condition is established). In addition, it can be considered that the adsorption amount of the reductant on the Nox catalyst affects the result of the abnormality diagnosis when the abnormality diagnosis means in the exhaust gas purifying device performs the abnormality diagnosis based on the detection result of the NOx sensor.

In particular, the exhaust gas purifying device according to the present invention uses the second condition in addition to the first condition when performing the abnormality diagnosis. That is, the abnormality diagnosis means in the exhaust gas purifying device according to the present invention performs the abnormality diagnosis only when there is no cause to lead the incorrect diagnosis based on the reductant adsorption on the NOx catalyst. This structure of the exhaust gas purifying device according to the present invention can increase the accuracy of the abnormality diagnosis.

The first condition includes various cases, in accordance with an excess discharging of NOx or reductant, for example, a case in which the NOx amount at the downstream side of the unit having NOx catalyst takes an abnormal value, a case in which a difference between the NOx amount in the exhaust gas at the upstream side and the NOx amount in the exhaust gas at the downstream side of the unit having SCR catalyst takes an abnormal value, and a case in which the NOx purifying rate takes an abnormal value.

It is acceptable for the exhaust gas purifying device to increase the adding amount of the reductant or to limit it. Still further, limiting the reductant adding amount includes halting addition of the reductant or decreasing the reductant adding amount.

In general, it is impossible to avoid a calculation error of the reductant adsorption amount when the exhaust gas purifying device calculates the reductant adding amount based on series data regarding a reductant adding amount and a reductant consumed amount in the SCR catalyst in the unit.

When there is a calculation error of the reductant adsorption amount on the NOx catalyst, because it is difficult to correctly calculate an optimum reductant adding amount, the calculated reductant adding amount becomes a small value or a large value when compared with an actual reductant adding amount. That is, there is possibility of a calculation error of the reductant adsorption amount causing discharging NOx or reductant into the exhaust gas pipe at the downstream side of the unit having the SCR catalyst. As a result, there is a possibility for the detection result of the NOx sensor to indicate the presence of an excess amount of NOx in the exhaust gas at the downstream side of the unit having the NOx catalyst.

On the other hand, because the calculation error of the reductant adsorption amount can be compensated and the exhaust gas purifying system can be returned into a usual operation mode, it is necessary to distinguish this case of the calculation error from the case of uncompensated abnormal state.

In accordance with another aspect of the present invention, the exhaust gas purifying device further has a reductant adsorption calculating means and an initialization performing means. The reductant absorption calculating means calculates a reductant adsorption amount on the NOx catalyst based on series data of a difference between a reductant adding amount to the NOx catalyst and a consumed reductant amount, where the reductant adding amount to the NOx catalyst follows adding the reductant by the reductant adding means, and the consumed reductant amount is consumed by reduction reaction using the NOx catalyst. The initialization performing means performs initialization of the reductant adsorption amount.

In the exhaust gas purifying device, the second condition (b) includes following two conditions, (b-1) the NOx purifying rate is not increased when the initialization performing means performs the initialization of the reductant adsorption amount, and (b-2) the number of times of increasing the NOx purifying rate by performing the initialization of the reductant adsorption amount is not less than a predetermined time.

Because this structure of the abnormality diagnosis means in the exhaust gas purifying device performs the abnormality diagnosis based on the detection result of the NOx sensor after the calculation error is specified, it is possible to perform the abnormality diagnosis under the state to eliminate a calculation error of the reductant adsorption amount. Therefore it is possible to avoid an incorrect diagnosis to judge an abnormal state which is impossible to recover as an abnormal state which is possible to recover.

For example, when there is an abnormal case in which the reductant adding means as the reductant adding valve supplies an excess amount of the reductant into the inside of the exhaust gas pipe, the reductant adsorption on the NOx catalyst becomes saturated, and the reductant is then discharged into the exhaust gas at the downstream side of the unit having the NOx catalyst. Thereby, the detection result of the NOx sensor placed at the downstream side of the unit having the NOx catalyst indicates that the exhaust gas contains an excess amount of the NOx.

When NOx is introduced into the NOx catalyst in the unit when an excess amount of the reductant is added into the inside of the exhaust gas pipe, because the reductant is consumed by the introduced NOx, the time to reach the saturation of the reductant adsorption amount is delayed. This delays detecting an abnormal state of adding the reductant.

In order to avoid this problem, the exhaust gas purifying device as another aspect of the present invention uses the second condition (b) which includes a working state of the internal combustion engine in which the NOx amount at the upstream side of the unit having the NOx catalyst is equal to zero or approximately equal to zero. Because this structure of the abnormality diagnosis means in the exhaust gas purifying device performs the abnormality diagnosis for the NOx sensor under the condition which is free from the influence based on the change of the consumed reductant amount, it is possible for the abnormality diagnosis means to correctly perform the abnormality diagnosis with high accuracy.

It is possible to judge, based on a detection result of an additional NOx sensor placed at an upstream side of the unit having NOx catalyst which directly detects the NOx amount at the upstream side of the unit having the NOx catalyst, the working state of the internal combustion engine in which the NOx amount at the upstream side is equal to zero or approximately equal to zero. Instead of this, for example, it is possible to detect the working state of the internal combustion engine and the NOx amount at the upstream side based on decrease in the fuel supply into the internal combustion engine or an idling condition of the internal combustion engine.

It can be considered that the exhaust gas purifying system has a high responsiveness because the reaction speed of catalyst is high when the NOx temperature is high. In addition, because there is a correlation between the catalyst's temperature and the reductant adsorption amount, the more the catalyst's temperature is high, the more the catalyst adsorption amount is decreased. (see FIG. 5, for example)

In this point of view, the exhaust gas purifying device as another aspect of the present invention uses the second condition (b) which includes a state in which a temperature of the NOx catalyst is within a predetermined high temperature range.

This structure of the abnormality diagnosis means in the exhaust gas purifying device according to the present invention performs the abnormality diagnosis based on a detection result of the NOx sensor under an optimum condition where the exhaust gas purifying system has a high responsiveness and the result of the abnormality diagnosis is free from fluctuation of the reductant adsorption amount. That is, the abnormality diagnosis means in the exhaust gas purifying device according to the present invention can perform the abnormality diagnosis under a condition based on the NOx detection result of the NOx sensor having a high reliability. This makes it possible to increase the accuracy of the abnormality diagnosis.

Because there is a correlation between the reductant adsorption amount of the NOx catalyst and the NOx purifying rate, the more the reductant adsorption amount is increased, the more the NOx purifying rate is increased. The NOx purifying rate becomes constant before it reaches 100%. (see FIG. 3)

Accordingly, when the NOx sensor placed at the downstream side of the unit having the NOx catalyst outputs a detection signal of an extremely small value, and when the NOx amount in the exhaust gas at the downstream side of the unit having the NOx catalyst is approximately equal to zero, there is a high probability for the NOx sensor to be in abnormal state because the NOx sensor does not output a detection signal corresponding to the NOx amount contained in the exhaust gas.

Accordingly, in the exhaust gas purifying device as another aspect of the present invention, the abnormality diagnosis means judges an occurrence of the abnormal state of the NOx sensor when the NOx amount at the downstream side of the unit having the NOx catalyst calculated based on a detection signal of the NOx sensor is approximately equal to zero, or the NOx purification rate calculated based on the detection signal of the NOx sensor is approximately equal to 100%.

Because the detection signal of the NOx sensor is changing constantly, there is a high probability to cause an incorrect diagnosis when the abnormality diagnosis means in the exhaust gas purifying device performs the abnormality diagnosis based on an instantaneous value of the detection signal of the NOx sensor.

Accordingly, it is preferable for the abnormality diagnosis means in the abnormality diagnosis means to use a diagnosis period of time which is a predetermined period of time counted after the reductant adding amount is changed, and to perform the abnormality diagnosis based on the detection result of the NOx sensor at a plurality of timings during the predetermined period of time. Specifically, the abnormality diagnosis means performs the abnormality diagnosis based on the accumulated value or an average value of the detection signals of the NOx sensor during the predetermined period of time.

It is considered for a response time to extend according to decreasing the temperature of the NOx catalyst because a reaction time of the NOx catalyst is changed according to changing the temperature of the NOx catalyst. Further, the more the reaction time in the NOx catalyst is long, the more the response time of the NOx sensor becomes long (that is, the more the responsibility of the NOx sensor decreases).

In this point of view, in the exhaust gas purifying device as another aspect of the present invention, the abnormality diagnosis means changes the diagnosis period of time based on a temperature of the NOx catalyst. This makes it possible to perform the abnormality diagnosis while considering the response time of the NOx sensor, and to suppress an occurrence of an incorrect diagnosis.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Embodiment

Figure 1:
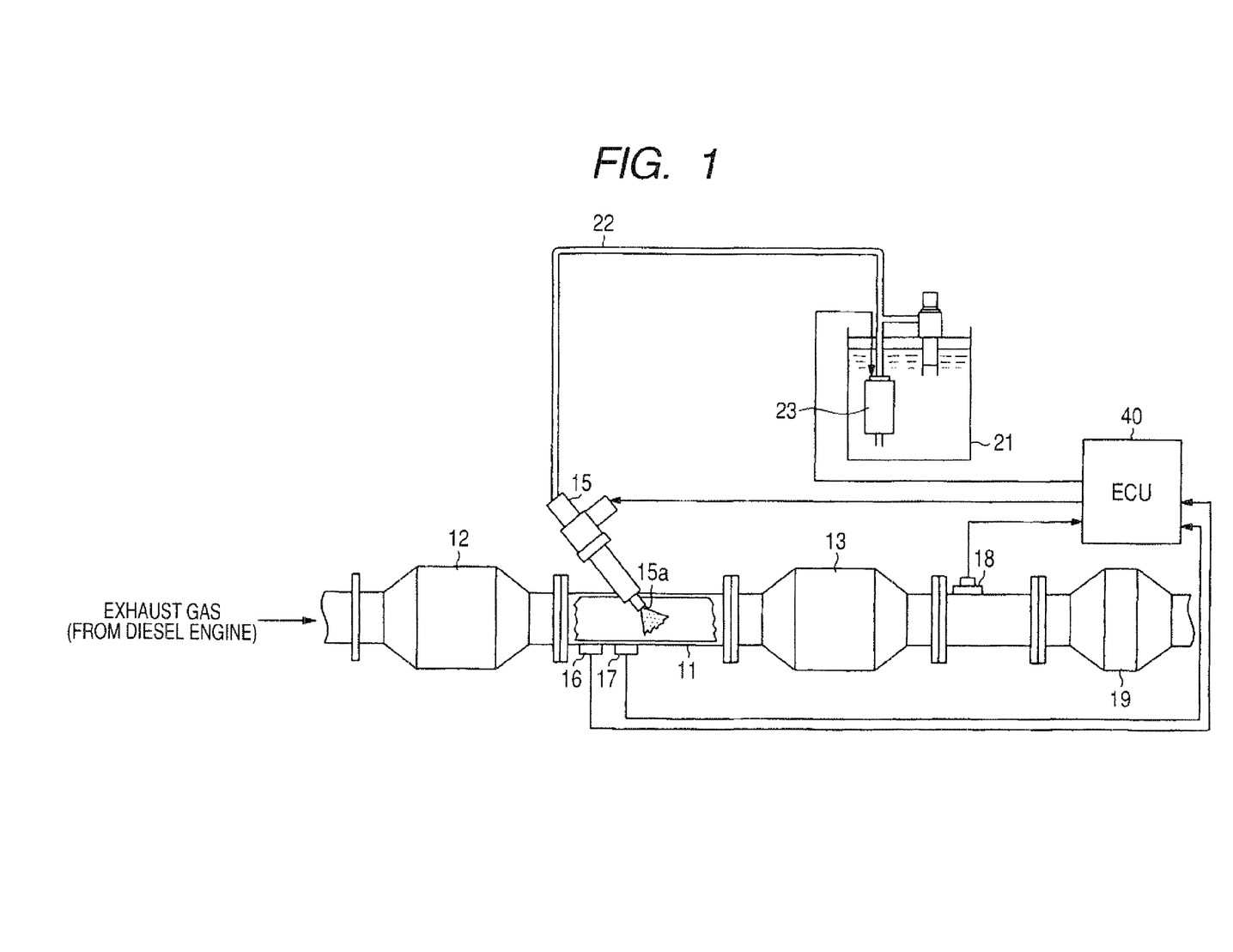
FIG. 1 is a view showing a schematic configuration of a urea SCR system (as an exhaust gas purifying system) having an exhaust gas purifying device according to an embodiment of the present invention.

A description will be given of an exhaust gas purifying system, with reference to FIG. 1 to FIG. 6, to which the exhaust gas purifying device according to an embodiment of the present invention is applied. The exhaust gas purifying system shown in FIG. 1 is capable of purifying NOx contained in an exhaust gas emitted from an internal combustion engine such as a diesel engine (not shown). For example, there is a urea SCR (Selective Catalytic Reduction) system as the exhaust gas purifying system which is capable of purifying NOx contained in an exhaust gas by using a selective reduction catalyst. The structure of the urea SCR system as the exhaust gas purifying system will be explained in detail.

FIG. 1 is a view showing a schematic configuration of such a urea SCR system as the exhaust gas purifying system according to the embodiment of the present invention.

As shown in FIG. 1, the urea SCR system is comprised of various types of actuators and sensors, and electric control unit (ECU), etc., to purify an exhaust gas emitted from an internal combustion engine (not shown) such as a diesel engine mounted to a vehicle.

In the exhaust gas purifying system for the diesel engine shown in FIG. 1, an exhaust gas pipe 1a forms an exhaust gas passage which is connected to the diesel engine (not shown). A diesel particulate filter (DPF) 12 and a unit 13 having selective reduction catalyst (hereinafter, referred to as the "unit 13 having SCR catalyst") are placed at the upstream side in the exhaust gas pipe 1a through which the exhaust gas flows.

A urea water adding valve 15 is provided with which urea water (or urea solution) is added into the inside of the exhaust gas pipe 11. The urea water adding valve 15 is placed on the exhaust gas pipe 11 between the DPF 12 and the unit 13 having SCR catalyst. The urea water serves as the reductant solution.

A NOx sensor 16 and a temperature sensor 17 are placed between the DPF 12 and the urea water adding valve 15. A NOx sensor 18 is placed in the exhaust gas pipe 11 at the downstream side of the unit 13 having SCR catalyst.

The temperature sensor 17 detects a temperature of the exhaust gas flowing through the inside of the exhaust gas pipe 11. A temperature of the SCR catalyst in the unit 13 (or the catalyst temperature) can be estimated based on the detection result of the temperature sensor 17.

In the pair of the NOx sensors 16 and 18 placed in the exhaust gas pipe 11, the NOx sensor 16 (which is placed at the upstream side) detects a concentration of NOx contained in the exhaust gas at the upstream side of the unit 13 having SCR catalyst. On the other hand, the NOx sensor 18 (which is placed at the downstream side) detects a concentration of NOx contained in the exhaust gas at the downstream side of the unit 13 having SCR catalyst.

In particular, the NOx sensor 18 is capable of detecting the concentration of ammonia in addition to the concentration of NOx. That is the more the concentration of ammonia is increased, the more the detection signal of the NOx sensor 18 has a large value.

A unit 19 having oxidizing catalyst is placed at the downstream side of the unit 13 having SCR catalyst in the exhaust gas pipe 11. The unit 19 having oxidizing catalyst is capable of eliminating ammonia. That is, the unit 19 having oxidizing catalyst serves as the ammonia eliminating device. Ammonia ($NH_3$) supplied from the unit 13 having SCR catalyst can be eliminated from the exhaust gas by the unit 19 having oxidizing catalyst.

Next, a description will be given of the configuration of each of the units which form the exhaust gas purifying system according to the embodiment of the present invention.

The DPF 12 is a particulate matter (PM) removing filter capable of capturing PM contained in the exhaust gas emitted from the diesel engine (not shown). The DPF 12 has an oxidizing catalyst made of platinum (Pt), and captures and eliminates HC (hydro carbon) and CO (carbon dioxide) in addition to soluble organic fraction as PM components contained in the exhaust gas emitted from the diesel engine.

The PM captured in the DPF 12 can be removed by performing post injection after a main fuel injection in the diesel engine. (This process corresponds to a regenerative process). This can allow the DPF 12 to be reused many times.

The SCR catalyst in the unit 13 can promote the reduction reaction (or an exhaust gas purifying reaction) of NOx. For example, the following reactions are performed in order to reduce NOx:

$$4NO + 4HNH_3 + O_2 \rightarrow 4N_2 + 6H_2O \quad \text{(Equation 1),}$$

$$6NO_2 + 8HNH_3 \rightarrow 7N_2 + 12H_2O \quad \text{(Equation 2), and}$$

$$NO + NO_2 + 2NH_3 \rightarrow 2N_2 + 3H_2O \quad \text{(Equation 3).}$$

The urea water adding valve 15, placed at the upstream side of the unit 13 having SCR catalyst, supplies ammonia ($NH_3$) which serves as reductant for NOx in the above reactions.

Because the urea water adding valve 15 approximately has the same structure of a usual fuel injection valve (or an injector) commercially available in the market, it is possible to easily apply it to the exhaust gas purifying system. Therefore the structure of the urea water adding valve 15 will be briefly explained here.

The urea water adding valve 15 is comprised of a drive part and a valve part. The drive part is composed of an electromagnetic solenoid. The valve part is composed of a urea water passage through which urea water is supplied, and the valve part has a needle with which a front-end injection hole 15a is open and closed.

The ECU 40 transfers a control signal to the urea water adding valve 15 in order to open and close the urea water adding valve 15. That is, the ECU 40 transfers the control signal to the urea water adding valve 15 to supply electric power to the electromagnetic solenoid. When receiving the electric power, the electromagnetic solenoid generates electromagnetic force. The needle is attracted by this electromagnetic force, and moves in the direction to open the needle. When the needle moves to open, the urea water is injected from the front-end injection hole 15a into the inside of the exhaust gas pipe 11 where the exhaust gas is flowing.

The urea water is constantly supplied to the urea water adding valve 15 from a urea water tank 21. The urea water tank 21 is a sealed container with a cap through which urea water is supplied. The urea water of a predetermined concentration (for example, 32.5%) is stored in the inside of the urea water tank 21. The urea water tank 21 is communicated with the urea water adding valve 15 through a urea water supplying pipe 22. A urea water passage (or a reductant passage) is formed in the inside of the urea water supplying pipe 22. A pump is placed on the way of the urea water supplying pipe 22. This pump is an inline type electric pump. The ECU 40 transfers a control signal to this pump. When receiving the driving signal from the ECU 40, the pump starts to rotate, and the urea water is supplied from the urea water tank 21 into the urea water supplying pipe 22.

The ECU 40 in the exhaust gas purifying system according to the present invention controls the exhaust gas purifying process. The ECU 40 is comprised of a known microcomputer (not shown), and controls the operation of various types of actuators such as the urea water adding valve 15 based on detection results of various types of sensors in order to perform the exhaust gas purifying process.

Specifically, the ECU 40 receives the detection signals from the NOx sensors 16 and 18, and controls a supplying period to supply electric power to the urea water adding valve 15, and the driving amount of the pump 23 to supply the urea water into the exhaust gas pipe 11. This control makes it possible to supply an optimum amount of urea water at an optimum timing into the inside of the exhaust gas pipe 11.

In the exhaust gas purifying system equipped with the ECU 40 (which serves as the exhaust gas purifying device according to the present invention) during the working of the diesel engine (not shown), the urea water stored in the urea water tank 21 is forcedly supplied into the urea water adding valve 15 through the urea water supplying pipe 22 by the pump 15, and the urea water is injected into the inside of the exhaust gas pipe 11 by the urea water adding valve 15. The exhaust gas and the urea water are thereby supplied to the SCR catalyst in the unit 13. In the unit 13, the NOx contained in the exhaust gas is reduced by the SCR catalyst. This purifies the exhaust gas. This reduction process allows the urea water to be hydrolyzed at a high temperature by the thermal energy of the exhaust gas and can be expressed by the following equation (4):

$$(NH_2)2CO+H_2O \rightarrow 2NH_3+CO_2 \qquad (4).$$

This reaction makes ammonia, and the ammonia is then adsorbed onto the SCR catalyst 13 in the unit 13. In the unit 13 having the SCR catalyst, the ammonia selectively reduces NOx contained in the exhaust gas, and removes NOx from the exhaust gas. That is, NOx is reduced by the reduction reaction (expressed by the reaction equations (1) to (4) previously described) using the ammonia on the SCR catalyst in the nit 13, and the exhaust gas is thereby purified.

Figure 2:
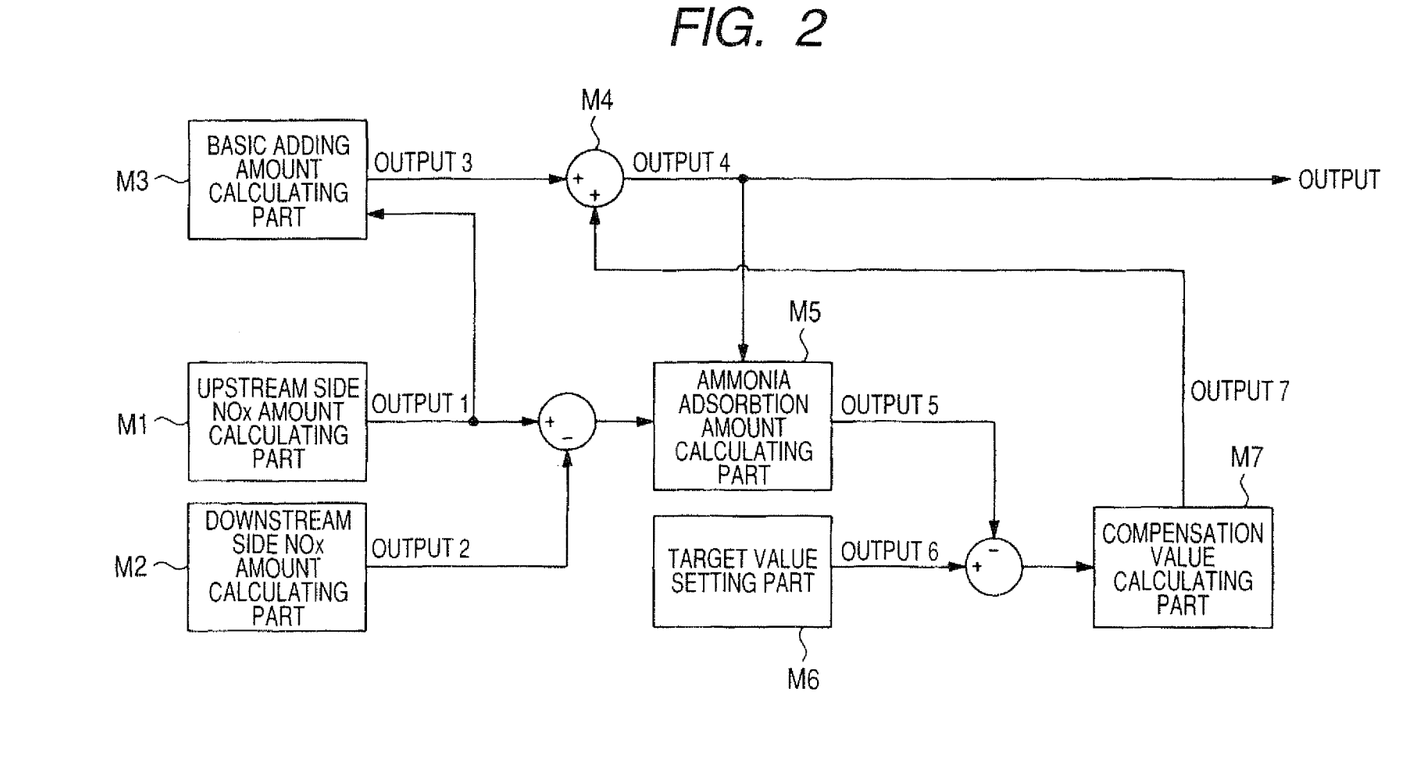
FIG. 2 is a view showing functional blocks in the exhaust gas purifying device to calculate an adding amount of urea water in the urea SCR system shown in FIG. 1.

FIG. 2 is a view showing functional blocks of the ECU 40 to calculate an adding amount of urea water into the inside of the exhaust gas pipe 11 in the exhaust gas purifying system as the urea SCR system shown in FIG. 1.

The adding amount of urea water can be calculated by the functional blocks M1 to M7 shown in FIG. 2.

The ECU 40 in the exhaust gas purifying system according to the embodiment is comprised of an upstream side NOx amount calculating part M1, a downstream side NOx amount calculating part M2, a base adding amount calculating part M3, an adding amount compensation part M4, an ammonia adsorption amount calculating part M5, a target value setting part M6, and a compensation amount calculating part M7.

The upstream side NOx amount calculating part M1 calculates an amount of NOx at the upstream side of the unit 13 having SCR catalyst, and outputs an upstream side NOx amount OUTPUT 1.

The downstream side NOx amount calculating part M2 calculates an amount of NOx at the downstream side of the unit 13 having SCR catalyst, and outputs a downstream side NOx amount OUTPUT 2.

The base adding amount calculating part M3 calculates a base adding amount OUTPUT 3 of urea water based on the calculated upstream side NOx amount OUTPUT 1. The urea water of the calculated base adding amount is supplied into the inside of the exhaust gas pipe 11 by the urea water adding valve 15.

The adding amount compensation part M4 calculates a urea water adding amount OUTPUT 4 by compensating the base adding amount OUTPUT 3 of urea water based on an adding amount compensating value OUTPUT 7 calculated by a compensation amount calculating part M7 (which will be explained later).

The ammonia adsorption amount calculating part M5 calculates an ammonia adsorption amount OUTPUT 5 based on a difference and a current urea water amount adding amount OUTPUT 4, where the difference is obtained by subtracting the OUTPUT 2 from OUTPUT 1 (Difference=Upstream side NOx amount OUTPUT 1 calculated by the upstream side NOx amount calculating part M1—Downstream side NOx amount OUTPUT 2 calculated by the downstream side NOx amount calculating part M2.

It is possible for the upstream side NOx amount calculating part M1 to use a NOx exhaust amount from the diesel engine as the upstream side NOx amount OUTPUT 1.

The target value setting part M6 sets a target value OUTPUT 6 as an ammonia adsorption amount. The compensation amount calculating part M7 calculates an adding amount compensation value OUTPUT 7 based on a difference between the ammonia adsorption amount OUTPUT 5 and the target value OUTPUT 6.

The urea water amount adding amount OUTPUT 4 corresponds to the output value of the urea water adding valve 15, where the urea water amount adding amount OUTPUT 4 is a sum of the base adding amount OUTPUT 3 and the adding amount compensation value OUTPUT 7.

The ECU 40 controls the urea water adding valve 15 to open based on the urea water amount adding amount OUTPUT 4.

The operation of the ammonia adsorption amount calculating part M5 will now be further explained.

The ammonia adsorption amount calculating part M5 calculates the ammonia supplying amount VA for SCR catalyst in the unit 13 based on the current urea water amount adding amount OUTPUT 4.

The ammonia adsorption amount calculating part M5 further calculates the ammonia consuming amount VB based on the NOx reaction amount ΔNOx (=upstream side NOx amount OUTPUT 1–downstream side NOx amount OUTPUT 2) which is a difference between the upstream side NOx amount OUTPUT 1 and the downstream side NOx amount OUTPUT 2.

The ammonia adsorption amount calculating part M5 then calculates an adsorption generation amount VC which is an ammonia adsorption amount when urea water is added by the urea water adding valve 15 based on the ammonia supplying amount VA and the ammonia consuming amount VB.

The ammonia adsorption amount calculating part M5 sequentially calculates the adsorption generation amount VC, and thereby calculates an actual ammonia adsorption amount OUTPUT 5 in the unit 13 having SCR catalyst.

That is, the series data of the reductant amount analysis in the unit 13 having SCR catalyst is the adsorption generation amount VC (=VA−VB) which is equal to the difference between the current ammonia supplying amount VA and the current ammonia consuming amount VB. Calculating the adsorption generation amount VC at a predetermined time interval, and adding the calculated adsorption generation amount VC can calculate and estimate the actual ammonia adsorption amount OUTPUT 5 on SCR catalyst in the unit 13.

Figure 3:
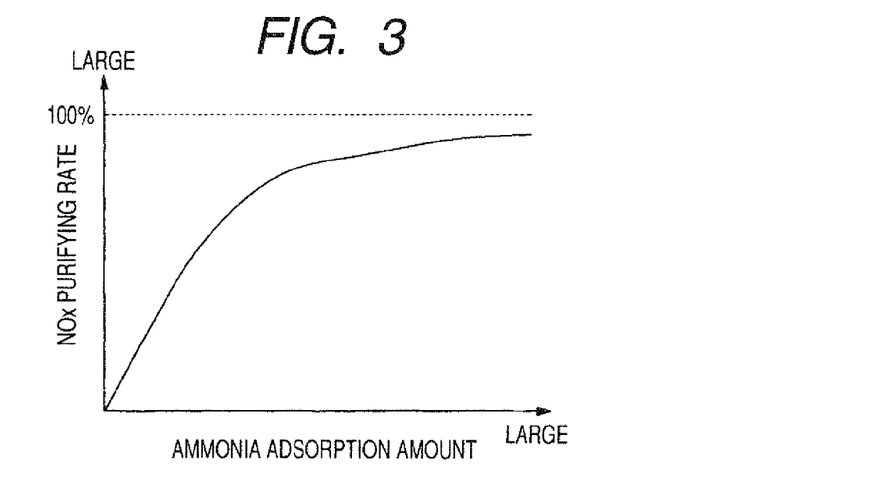
FIG. 3 is a view showing a catalyst characteristic indicating a relationship between a NOx purifying rate and an ammonia adsorption amount in the urea SCR system equipped with the ECU shown in FIG. 1.

FIG. 3 is a view showing a catalyst characteristic which shows a relationship between the NOx purifying rate and the ammonia adsorption amount in the urea SCR system equipped with the ECU 40 according to the embodiment of the present invention.

The urea SCR system as the exhaust gas purifying system equipped with the ECU 40 according to the embodiment performs an initialization process for the ammonia adsorption amount OUTPUT 5 based on the NOx purifying rate of SCR catalyst in the unit 13 by using the catalyst characteristics showing the relationship between the NOx purifying rate and the ammonia adsorption amount shown in FIG. 3. This initialization process eliminates a calculation error of the ammonia adsorption amount OUTPUT 5.

Specifically, the NOx amount (that is, the upstream side NOx amount OUTPUT 1) which is sequentially supplied to SCR catalyst in the unit 13 is sequentially added to obtain a NOx accumulation amount. When the NOx accumulation amount becomes not less than a predetermined value, the ECU 40 calculates the ammonia adsorption amount based on the NOx purifying rate using the relationship shown in FIG. 3, and the ammonia adsorption amount is initialized based on this calculated value as the initial value.

The ECU 40 in the urea SCR system as the exhaust gas purifying system judges whether or not the ammonia slip occurs based on the output value of the downstream side NOx sensor 18. Specifically, the urea water adding amount supplied through the urea water adding valve 15 is forcedly changed when the occurrence of the ammonia slip is estimated. The ECU 40 judges the occurrence of ammonia slip according to the increasing or the decreasing of the output value of the downstream side NOx sensor 18.

On controlling the process to forcedly change the urea water adding amount through the urea water adding valve 15 into the inside of the exhaust gas pipe 11, the ECU 40 of the embodiment monitors the output of the downstream side NOx sensor 18 while limiting the urea water adding amount. When the output of the downstream side NOx sensor 18 is shifted toward the decreasing state, the ECU 40 judges the occurrence of ammonia slip caused by the increasing of the output of the downstream side NOx sensor 18.

Figure 4:
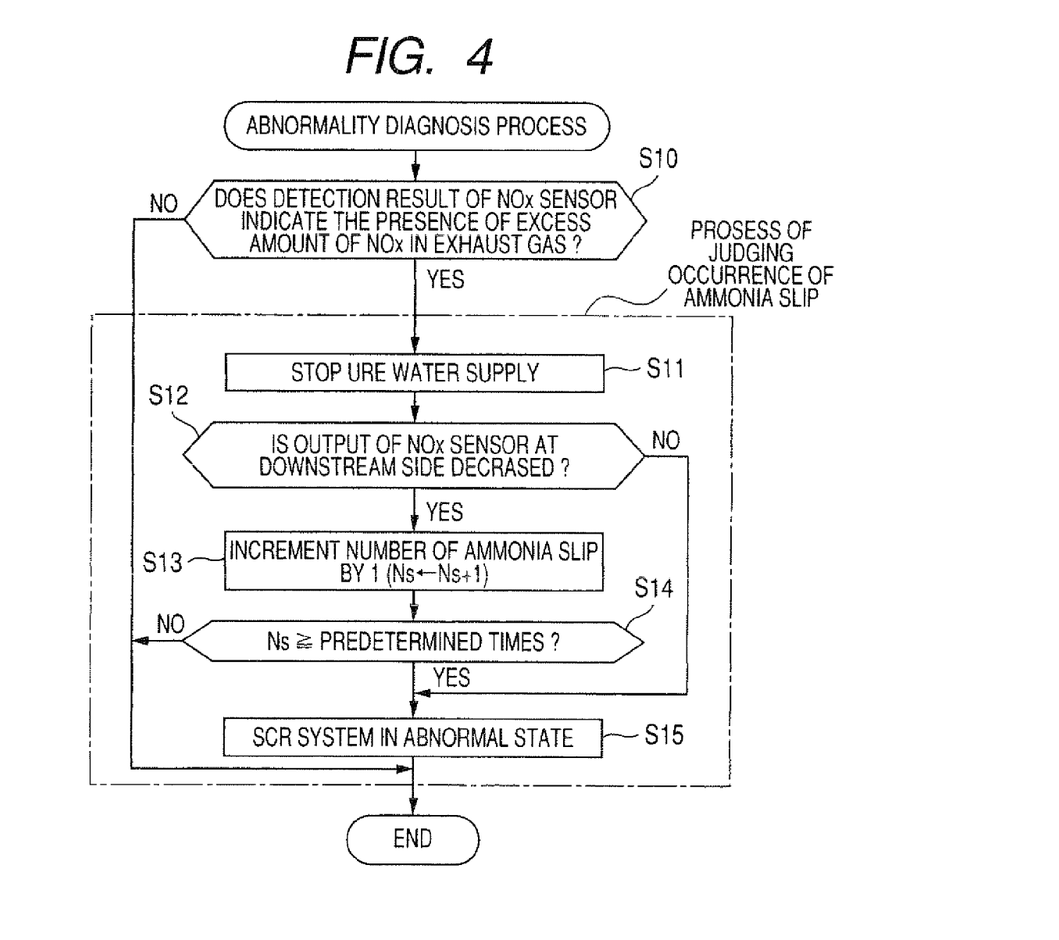
FIG. 4 is a flow chart showing a procedure of the ECU to perform an abnormality diagnosis process according to the embodiment of the present invention.

FIG. 4 is a flow chart showing the procedure of the ECU 40 to perform an abnormality diagnosis process according to the embodiment of the present invention.

The ECU 40 as the exhaust gas purifying device according to the embodiment of the present invention periodically executes the abnormality diagnosis process shown in FIG. 4 at a predetermined interval.

As shown in FIG. 4, the ECU 40 in the urea SCR system of the embodiment judges whether or not the detection result of the downstream side NOx sensor 18 indicates the presence of an excess amount of NOx in the exhaust gas which is flowing in the exhaust gas pipe 11 (First condition).

In the embodiment of the present invention, this first condition includes at least one of:

(a) the downstream side NOx amount OUTPUT 2 is not less than a predetermined value;

(b) the NOx purifying rate is not more than a predetermined value; and (c) when the difference obtained by subtracting the downstream side NOx amount OUTPUT 2 from the upstream side NOx amount OUTPUT 1 is not more than a predetermined value.

In the structure of the urea SCR system according to the embodiment, because the downstream side NOx sensor 18 is capable of detecting both NOx and ammonia, it is difficult to specify whether an excess amount of NOx in the exhaust gas is caused by the presence of NOx or ammonia based on the first condition, in other words, based on the NOx detection result of the downstream side NOx sensor 18.

The NOx purifying rate can be calculated by dividing the difference between the upstream side NOx amount OUTPUT 1 and the downstream side NOx amount OUTPUT 2 by the upstream side NOx amount OUTPUT 1. That is, when the upstream side NOx amount OUTPUT 1 is Y1 and the downstream side NOx amount OUTPUT 2 is Y2, the NOx purifying rate NA can be expressed by the following equation, $$NA = (Y1 - Y2)/Y1.$$

When the NOx detection result of the downstream side NOx sensor 18 indicates that the exhaust gas contain surplus amount of NOx, the operation flow goes to step S11.

In step S11, the ECU 40 instructs the urea water adding valve 15 to halt supplying the urea water in the exhaust gas pipe 11. In step S12, the ECU 40 judges whether or not the output of the downstream side NOx sensor 18 is decreased by halting the supply of the urea water into the exhaust gas pipe 11.

In the embodiment, the ECU 40 performs the above judgment based on the output of the downstream side NOx sensor 18 after a predetermined period of time is elapsed while considering a response delay of the downstream side NOx sensor 18.

When the output of the downstream side NOx sensor 18 is decreased by the halting of the supply of urea water into the exhaust gas pipe 11, the operation flow progresses to step S13.

In step S13, the ECU 40 determines the occurrence of ammonia slip in the urea SCR system as the exhaust gas purifying system of the embodiment. The ECU 40 increments a generation number Ns of ammonia slip by a predetermined value (for example, by one). That is, when the supply of urea water is limited when the ammonia slip occurs, the amount of ammonia discharged into the downstream side of the unit 13 having SCR catalyst is decreased to correctly adjust the adding amount of urea water.

Further, NOx contained in the exhaust gas is reduced and purified by the reaction with ammonia which is adsorbed on the SCR catalyst in the unit 13. As a result, it is possible for the ECU 40 to suppress the exhaust gas from containing ammonia and NOx at the downstream side of the unit 13 having SCR catalyst. This decreases the output of the downstream side NOx sensor 18.

When judging the occurrence of ammonia slip, the ECU 40 judges whether it can be improved or not (i.e. whether the malfunction of the system can be mitigated). That is, in step S14, the ECU 40 judges whether the generation number Ns of ammonia slip is not less than the predetermined value or not. This generation number of ammonia slip is a generation number of ammonia slip after turning on the ignition of the diesel engine.

When the generation number of ammonia slip is less than the predetermined value, the process shown in FIG. 4 is completed. Then, for example, the ECU 40 performs the process of controlling the urea water adding amount in another routine of the program in order to avoid the occurrence of the ammonia slip.

On the other hand, when the generation number of ammonia slip is not less than the predetermined number, the operation flow goes to step S15. In step S15, the ECU 40 determines the occurrence of malfunction of the urea SCR system. That is, it can be considered for the number of occurrence of the ammonia slip to be increased when the ammonia slip occurs based on the malfunction of the urea water adding valve 15 or an abnormal concentration of urea water. When the generation number of occurrence of ammonia slip takes a high value, the ECU 40 judges that the urea SCR system has fallen into an abnormal state. The ECU 40 instructs a warning lamp to light up in order to supply a warning to an operator of the urea SCR system, and stops the supply of urea water into the exhaust gas pipe 11.

On the other hand, when the output of the downstream side NOx sensor 18 is not decreased even if the supply of urea water is stopped, the operation flow progresses to step S15. In step S15, the ECU 40 judges that the urea SCR system is in an abnormal state for some reason.

For example, the following reasons can be considered:
an optimum control to supply an optimum amount of urea water into the exhaust gas pipe 11 is not performed, and an insufficient amount (or less amount) of urea water is supplied into the exhaust gas pipe 11, and an excess amount of NOx is thereby discharged in the exhaust gas which is flowing in the exhaust gas pipe 11;
an optimum amount of urea water is not supplied into the exhaust gas pipe 11 because the exhaust gas pipe 11 is broken;
the unit 13 having SCR catalyst is deteriorated, and the NOx purifying process is not correctly performed;
a concentration of urea water is lower than a predetermined concentration value; and
limiting the adding amount of urea water is not correctly performed.

On detecting the occurrence of ammonia slip based on the output value of the downstream side NOx sensor 18, in order to forcedly limit the adding amount of urea water, the process to perform the inherent control to control the adding amount of urea water is halted for the NOx purification during the period of performing the abnormality diagnosis. It is thereby considered not to be correctly performing the NOx purification. That is, when the adding amount of urea water is limited when it is unknown whether the reason why the NOx purifying parameter is within an abnormal range is caused by NOx or ammonia, the lack of the ammonia supplying amount is further decreased, and this further increases the excess amount of NOx contained in the exhaust gas. Therefore it is preferable to decrease the number of execution of the abnormality diagnosis, and it is preferable to perform the abnormality diagnosis with high accuracy.

In the abnormality diagnosis based on the detection value of the downstream side NOx sensor 18, it can be considered for the ammonia adsorption on SCR catalyst in the unit 13 to affect the result of the abnormality diagnosis. That is, because the downstream side NOx sensor 18 has a sensitivity to ammonia, a difference between an adsorption amount of ammonia adsorbed on SCR catalyst in the unit 13 and a consumed amount of the absorbed ammonia affects the detection result of the downstream side NOx sensor 18. Accordingly, when the abnormality diagnosis is performed under the state in which the adsorbed ammonia amount easily fluctuates, it can be considered to decrease the accuracy of the abnormality diagnosis.

The ECU 40 in the urea SCR system as the exhaust gas purifying system according to the embodiment performs the abnormality diagnosis process only when a predetermined condition (as a second condition) is satisfied, where the predetermined operation condition is the state not to cause any incorrect diagnosis by ammonia adsorption on SCR catalyst in the unit 13. Execution of the second condition (which is composed of steps S22 to S29 shown in FIG. 6 which will be explained later) decrease the number of times of performing the abnormality diagnosis process composed of steps S11, S12, S13, S14, and S15 shown in FIG. 4, and keep the accuracy of the abnormality diagnosis process. By the way, the abnormality diagnosis process composed of steps S11, S12, S13, S14, and S15 shown in FIG. 4 approximately corresponds to the abnormality diagnosis process in step S30 shown in FIG. 6.

Figure 6:
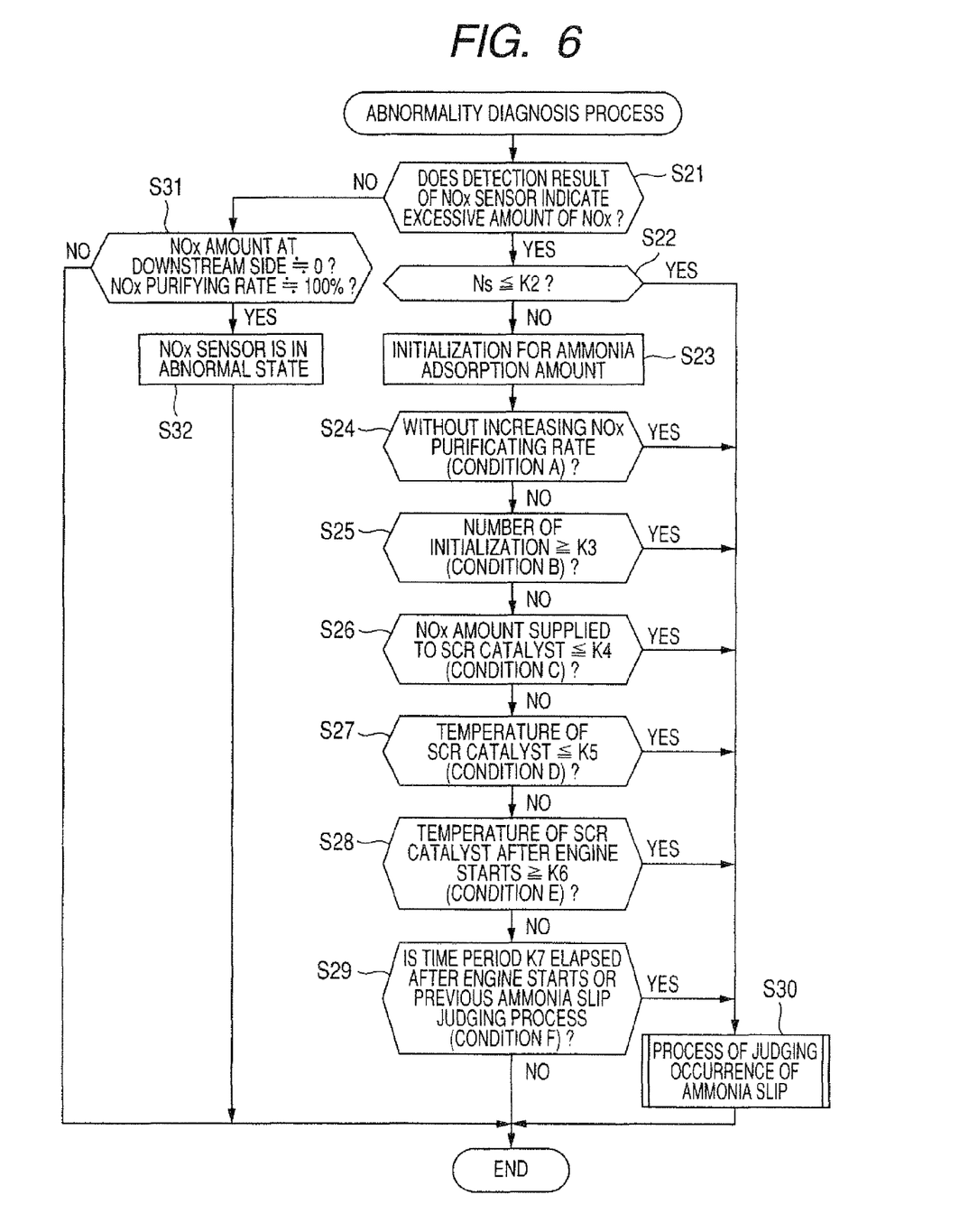
FIG. 6 is a flow chart showing a procedure of an abnormality diagnosis process in the urea SCR system equipped with the ECU as the exhaust gas purifying device according to the embodiment of the present invention.

The following actual execution conditions (A) to (F) correspond to steps S24, S25, S26, S27, S28, and S29 shown in FIG. 6. Those steps S24 to S28 will be explained later in reference to the flow chart shown in FIG. 6.

In the embodiment, the ECU 40 executes the process (ammonia slip judgment process) composed of the steps S11 to S15 shown in FIG. 4 only when at least one of the following conditions (A) to (F) is satisfied.

Condition (A): the NOx purifying rate is not increased even if an error of the ammonia adsorption amount is compensated;

Condition (B): the number of initialization process of initializing the ammonia adsorption amount is not less than a predetermined value K3;

Condition (C): the engine is in the working state in which the amount of NOx to be supplied to SCR catalysis in the unit 13 is not more than a predetermined value K4;

Condition (D): the SCR catalyst temperature is not less than a predetermined value K5; and Condition (E): the SR catalyst temperature becomes not less than a predetermined value K6 at the first time after the diesel engine starts.

In addition to the above conditions (A) to (E), it is also possible to perform the above abnormality diagnosis when the following condition (F) is satisfied in order to achieve the early detection of the abnormal state of the urea SCR system:

Condition (F): A time period counted from the start of the diesel engine or the previous detection process of detecting the occurrence of ammonia slip is elapsed becomes not less than a predetermined value K7.

Each of the above conditions (A) to (F) will now be explained in detail.

Condition (A): the NOx purifying rate is not increased even if an error of the ammonia adsorption amount is compensated.

When there is a difference between an actual ammonia adsorption amount and a calculated value, the adding amount of urea water through the urea water adding valve 15 becomes insufficient or excessive amount. Such an error caused in the calculation can be compensated by the initializing process for the ammonia adsorption amount. It is not necessary to shift an escaping driving mode (during a usual driving mode of the vehicle), and it is possible for the NOx detection result to be correctly shifted from the abnormal state to the normal state.

On the other hand, it is difficult during the usual operation for the urea SCR system to be returned to the normal state from the abnormal state such as the malfunction of the urea water adding valve 15 and the abnormal concentration of urea water. It is necessary to give a warning to the driver of a vehicle in order to escape the vehicle from an accident.

When the incorrect diagnosis occurs, for example, when the diagnosis result indicates an abnormal state based on a calculation error such as an error of the ammonia adsorption amount instead of the abnormal state which is required to perform the escaping driving of a vehicle or to give a warning to the driver of the vehicle, it is judged whether or not the SCR system is returned to the usual state. The urea SCR system of the embodiment allows the vehicle to be driven normally based on such an incorrect diagnosis.

On the other hand, when the incorrect diagnosis occurs, for example, when the diagnosis result indicates the occurrence of the abnormal state in the urea SCR system instead of indicating the calculation error such as an error of the ammonia adsorption amount, the ECU 40 selects escaping the vehicle from an accident or gives a warning to the driver of the vehicle although it is possible to return it to the normal state while the vehicle continues the usual driving.

It is therefore preferable to eliminate, in advance from the selection options, the case of calculation error of the ammonia adsorption amount which is caused by the NOx detection result of the downstream side NOx sensor 18 which indicates an excess amount of NOx in the exhaust gas.

Condition (B): The number of initialization processes of initializing the ammonia adsorption amount is not less than the predetermined value K3.

When the execution frequency to perform the initialization process for the calculation error of the ammonia adsorption amount is high even if the NOx purifying rate is increased by performing such an initialization process for the ammonia adsorption amount, that is, when the frequency of the case which indicates the presence of an excess amount of NOx in the exhaust gas indicated by the NOx detection result of the downstream side NOx sensor 18 is high, there is a probability not to correctly supply an optimum amount of ammonia, and of being in an abnormal state of the urea SCR system. Accordingly, the ECU 40 performs the ammonia slip judging process when the number of the initialization process for the ammonia adsorption amount is high.

Condition (C): The engine is in the working state in which the amount of NOx to be supplied to SCR catalysis in the unit 13 is not more than the predetermined value K4.

When an excess amount of urea water is supplied into the SCR catalyst in the unit 13, the ammonia adsorption amount on the SCR catalyst in the unit 13 becomes saturated. Because an excess amount of ammonia is then discharged into the downstream side of the unit 13 having SCR catalyst, the NOx detection result by the downstream side NOx sensor 18 indicates an excess amount of NOx. At this time, because the ammonia is consumed by the introduced NOx when this NOx is supplied to SCR catalyst in the unit 13, the period to reach saturation of the ammonia adsorption on the SCR catalyst is delayed. As a result, the detection of the abnormal state caused by supplying an excess amount of ammonia is delayed. Therefore the ECU 40 in the urea SCR system of the embodiment performs the ammonia slip judgment process under the condition which is not influenced by the NOx adding amount (that is, the condition which is not influenced by the fluctuation of the consumption of ammonia). That is, the ECU 40 performs the ammonia slip judgment process when the amount of NOx at the upstream side of the unit 13 having SCR catalyst is equal to zero or a value close to zero.

The condition of the engine in which the NOx amount OUTPUT 1 at the upstream side of the unit 13 containing SCR catalyst is not more than the predetermined value K4 is detected based on the output value of the NOx sensor 16 placed at the upstream side of the unit 13 having SCR catalyst.

It is also possible for the ECU 40 to determine that the above condition (C) is satisfied when the fuel injection amount in the diesel engine is equal to zero or approximately zero, or when the fuel injection amount is limited, or when the diesel engine is in idling.

Condition (D): The SCR catalyst temperature is not less than the predetermined value K5.

In general, the reaction speed of SCR catalyst is high at a high temperature of SCR catalyst, and a responsibility of the entire of the urea SCR system is good. Accordingly, it is preferred to increase the accuracy of detecting the abnormality diagnosis based on the detection result of the NOx sensor 18 when the NOx sensor 18 has a small output range in fluctuation.

Figure 5:
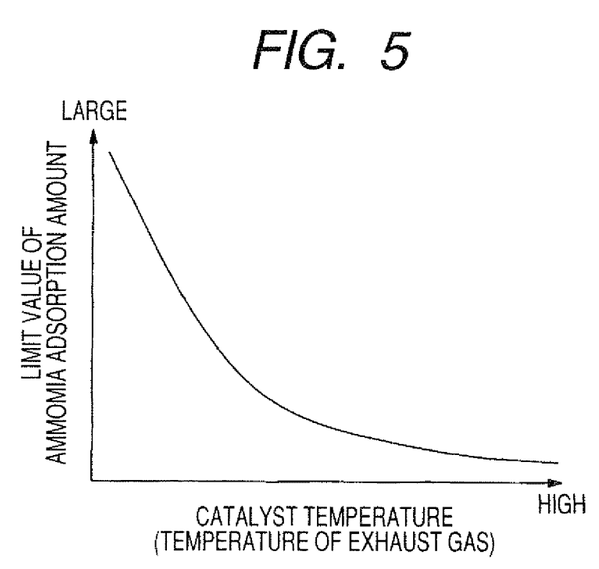
FIG. 5 is a view showing a relationship between a SCR catalysis temperature and a limit value of an ammonia adsorption amount in the urea SCR system equipped with the ECU as the exhaust gas purifying device according to the embodiment of the present invention.

FIG. 5 is a view showing a relationship between a SCR catalysis temperature and an ammonia adsorption amount in the urea SCR system.

As shown in FIG. 5, the more the SCR catalyst temperature is shifted to a high temperature side, the more the adsorption amount of ammonia on the SCR catalyst is decreased. Therefore it is not necessary to consider the ammonia adsorption amount by the SCR catalyst at a temperature of not less than a predetermined temperature (for example, not less than 400° C.).

The more the temperature of the SCR catalyst is high, the more the influence caused by changing the ammonia adsorption amount becomes small, it is thereby possible to increase the accuracy of the abnormality diagnosis. In particular, during the DPF regenerative mode, because the temperature of the exhaust gas is strictly controlled in order to prevent the DPF 12 from melting, it is possible for the above control to suppress the fluctuation of the output of the NOx sensor 18.

(E) The SCR catalyst temperature becomes not less than the predetermined value K6 at the first time after the diesel engine starts.

It is possible to detect the abnormal state caused when the vehicle stops only after the diesel engine restarts.

In addition, it can be considered that a calculation error of the ammonia adsorption amount is relatively small, and the fluctuation of the sensor output based on changing the ammonia adsorption amount becomes small when immediately after the engine restarts.

On the other hand, because the SCR catalyst is inactive when the temperature of the SCR catalyst is lower than its activation temperature, there is a tendency to decrease the NOx purifying rate regardless of the occurrence of abnormal state. Accordingly, the ECU 40 executes the ammonia slip judgment process when the temperature of the SCR catalyst becomes not less than its activation temperature after the engine restarts. This can detect the abnormal state caused during the stop of the diesel engine as early as possible.

(F) A time period counted from the start of the diesel engine or the previous detection process of detecting the occurrence of ammonia slip is elapsed becomes not less than the predetermined value K7.

It is possible to suppress the continuation of the abnormal state by performing the abnormality diagnosis at a predetermined time interval which is determined in advance. Therefore the ECU 40 performs the above abnormality diagnosis process every the predetermined period of time.

FIG. 6 is a flow chart showing the procedure of the abnormality diagnosis process in the urea SCR system according to the embodiment of the present invention.

The ECU 40 executes the process shown in FIG. 6 every the predetermined period of time.

In step S21, the ECU 40 detects whether or not the NOx detection result of the NOx sensor 18 indicates the presence of an excess amount of NOx in the exhaust gas (which indicates the First condition, previously explained). This process is the same process of step S10 shown in FIG. 4.

When the NOx detection result of the NOx sensor 18 indicates the presence of an excess amount of NOx in the exhaust gas, the operation flow progresses to step SS22. In step S22, the ECU 40 judges whether or not the NOx purifying rate is not more than the predetermined value K2. This predetermined value K2 is within an abnormal range, for example, which is near to zero. When the NOx purifying rate is a very low value, there is a probability of causing some abnormal state in the urea SCR system. Therefore the ECU 40 of the embodiment performs the ammonia slip detection process, as previously explained, when the NOx purifying rate is a very low value. This detects the occurrence of abnormal state and the contents of the abnormal state when the abnormal state occurs as early as possible.

In step S22, it is possible for the ECU 40 to detect the occurrence of abnormal state based on the NOx amount OUTPUT 2 at the downstream side of the unit 13 or a difference between the NOx amount OUTPUT 1 at the upstream side and the NOx amount OUTPUT 2 at the downstream side of the unit 13 containing SCR catalyst.

When the NOx purifying rate is more than the predetermined value K2, the ECU 40 judges whether each of the conditions (A) to (F) previously explained is satisfied or not in the steps S24, S25, S26, S27, S28, and S29, respectively, after step S23. That is, the ECU 40 performs the initialization for the ammonia adsorption amount in step S23, and judges whether or not the NOx purifying rate is increased in step S24 (as the condition (A)).

When the judgment result in step S24 is YES, the operation flow goes to step S30. In step S30, the ECU 40 executes the ammonia slip judgment process.

On the other hand, when the judgment result in step S24 indicates negative ("NO"), in other words, when the judgment result in step S24 indicates that the NOx purifying rate is increased, the operation flow goes to step S25. In step S25, the ECU 40 judges whether or not the number of process to perform the initialization for the ammonia adsorption amount is not less than the predetermined value K3 (as the condition (B)).

When the judgment result in step S25 is YES, the operation flows goes to step S30. In step S30, the ECU 40 executes the ammonia slip judgment process.

On the other hand, when the judgment result in step S25 indicates negation ("NO"), in other words, when the judgment result in step S25 indicates that the number of process to perform the initialization for the ammonia adsorption amount is less than the predetermined value K3, the operation flow goes to step S26. In step S26, the ECU 40 judges whether or not the NOx amount to be added into SCR catalyst in the unit 13 is not more than the predetermined value K4 in the engine working state (as the condition (C)).

When the judgment result in step S26 is YES, the operation flows goes to step S30. In step S30, the ECU 40 executes the ammonia slip judgment process.

On the other hand, when the judgment result in step S26 indicates negation ("NO"), in other words, when the judgment result in step S26 indicates that the NOx amount to be added into SCR catalyst in the unit 13 is more than the predetermined value K4, the operation goes to step S27. In step S27, the ECU 40 judges whether or not the temperature of SCR catalyst is not more than the predetermined value K5 (as the condition (D)).

When the judgment result in step S27 indicates YES, the operation flows goes to step S30. In step S30, the ECU 40 executes the ammonia slip judgment process.

On the other hand, when the judgment result in step S27 indicates negation ("NO"), in other words, when the judgment result in step S27 indicates that the temperature of SCR catalyst is more than the predetermined value K5, the operation flow goes to step S28. In step S28, the ECU 40 judges whether the temperature of SCR catalyst detected at a first time after the diesel engine starts is not less than the predetermined value K6 (as the condition (E)).

When the judgment result in step S28 is YES, the operation flows goes to step S30. In step S30, the ECU 40 executes the ammonia slip judgment process.

On the other hand, when the judgment result in step S28 indicates negation ("NO"), in other words, when the judgment result in step S28 indicates that the temperature of SCR catalyst detected at a first time after the diesel engine starts is less than the predetermined value K6, the operation flow goes to step S29. In step S29, the ECU 40 judges whether or not the time period, counted from the start of the diesel engine or the previous detection process of detecting the occurrence of ammonia slip is elapsed, becomes not less than the predetermined value K7 (as the condition (F)).

When the judgment result in step S29 is YES, the operation flows goes to step S30. In step S30, the ECU 40 executes the ammonia slip judgment process.

On the other hand, the judgment result in step S29 indicates negation ("NO"), the ECU 40 completes the abnormality diagnosis process shown in FIG. 6.

In summary, when the judgment result of each of the steps S24 to S29 is YES, the ECU 40 executes the ammonia slip judgment process in step S30.

The ECU 40 in the urea SCR system according to the embodiment judges the occurrence of abnormal state of the NOx sensor when detecting that the NOx purifying rate is very good. Specifically, when the NOx purifying parameter is not within the abnormal range, the judgment result in step S21 indicate negation, the operation flow goes to step S31. In step S31, the ECU 40 judges whether or not the downstream side NOx amount OUTPUT 2 which is calculated based on the output value of the downstream side NOx sensor 18 is approximately equal to zero, or the NOx purifying rate which is calculated based on the output value of the upstream side NOx sensor 16 and the downstream side NOx sensor 18 is approximately equal to 100%. When the judgment result is YES, the operation flow goes to step S32. In step S32, the ECU 40 judges that the downstream side NOx sensor 18 is in abnormal state.

The reason why the ECU 40 judges that the NOx sensor 18 is in the abnormal state even if the NOx purifying rate has a very good value is as follows.

As shown in FIG. 3, there is a correlation between the ammonia adsorption amount of SCR catalyst in the unit 13 and the NOx purifying rate, and the more the ammonia adsorption amount is increased, the more the NOx purifying rate is increased. This allows the NOx purifying rate to be approximately constant before the ammonia adsorption amount reaches 100%.

Accordingly, when the output of the NOx sensor 18 placed at the downstream side of the unit 13 having SCR catalyst is very small, and the NOx amount in the exhaust gas at the downstream side of the unit 13 is approximately equal to zero, it is considered for the NOx sensor to be in abnormal state because the output of the NOx sensor does not reach a correct value which corresponds to the amount of NOx contained in the exhaust gas. That is, the NOx purifying rate which is calculated based on the output value of the NOx sensor 18 does not approximately reach 100% unless the downstream side NOx sensor 18 is in normal condition. Accordingly, the ECU 40 in the urea SCR system of the embodiment judges for the NOx sensor to be in abnormal state when the NOx purifying rate has an extremely good rate.

The urea SCR system equipped with the ECU 40 as the exhaust gas purifying device according to the embodiment of the present invention has the following superior effects.

Because the ECU 40 in the urea SCR system according to the embodiment is configured to perform the ammonia slip judging process when there is no incorrect diagnosis to be caused by the ammonia adsorption on SCR catalyst in the unit 13, it is possible to increase the accuracy of the abnormality diagnosis.

The ECU 40 in the urea SCR system is configured to perform the abnormality diagnosis based on the output of the NOx sensor 18 placed at the downstream side of the unit 13 having SCR catalyst only when at least one of the conditions (A) to (F) is satisfied under the condition to forcedly limit the amount of adding the urea water. Accordingly, it is possible to decrease interrupting the process of controlling the urea water adding amount. Therefore it is possible for the structure of the urea SCR system to suppress discharging NOx to be caused by performing the abnormality diagnosis by the ECU 40 while changing the urea water adding amount.

Because the ECU 40 is configured to perform the ammonia slip judgment process when the NOx purifying rate is not increased after initializing the ammonia adsorption amount (Condition (A)), the ECU 40 can perform the abnormality diagnosis of the urea SCR system while avoiding the risk of discharging NOx or ammonia into the exhaust gas caused by a calculation error of the ammonia adsorption amount. Accordingly, it is possible to avoid any occurrence of incorrect diagnosis, for example, the ECU 40 allows the system to be returned to a normal state instead of indicating the system not to be returned to the normal state based on the detection signal of the NOx sensor 18. This can increase and keep the reliability of the detection result of the NOx sensor 18.

Because the ECU 40 is configured to perform the ammonia slip judgment process when the number of performing the initialization process for the ammonia adsorption amount is not less than the predetermined value K3 (Condition (B)), it is possible to detect such abnormal state as early as possible when there is a probability of causing the system error when the frequency to generate the calculation error of the ammonia adsorption amount is high.

Because the ECU 40 is configured to perform the ammonia slip judgment process when the temperature of the SCR catalyst is not less than the predetermined value K5 (Condition (D)), it is possible to perform the abnormality diagnosis under the condition with a high responsiveness of the urea SCR system. Accordingly, the NOx sensor 18 placed at the downstream side of the unit 13 having SCR catalyst has a small fluctuation, and this makes it possible to increase the accuracy of judging the abnormal state based on the output of the NOx sensor. In addition, because the ammonia adsorption amount on the SCR catalyst becomes small, this makes the influence of the output of the NOx sensor caused by changing the ammonia adsorption amount small, and it is thereby possible to increase the accuracy of the abnormality diagnosis.

Because the ECU 40 is configured to perform the ammonia slip judgment process when the NOx amount detected by the NOx sensor 16 placed at the upstream side of the unit 13 having SCR catalyst is not more than the predetermined value K4 (Condition (C)), it is possible for the ECU 40 to perform the abnormality diagnosis under the condition which is difficult to receive the influence of changing the NOx adding amount into the unit having SCR catalyst. That is, it is possible for the ECU 40 to perform the ammonia slip judgment process under the condition of being free from the influence caused by changing of the ammonia consumption.

Because the ECU 40 is configured to judge that the NOx sensor 18 is in abnormal state when the NOx amount in the exhaust gas at the downstream side of the unit 13 having SCR catalyst is approximately equal to zero, or when the NOx purifying rate is approximately equal to 100%, it is possible to suppress occurrence of omission of detecting the abnormal state.

Because it is judged that there is a high probability of the SCR system to be in some abnormal state, the ECU 40 performs the ammonia slip judgment process regardless of the satisfaction of at least one of the conditions (A) to (F) previously explained. This makes it possible to detect the abnormal state as early as possible, and to specify the reason of causing the abnormal state as early as possible.

Other Modifications

The concept of the present invention is not limited by the embodiment previously described. For example, it is possible for the ECU 40 in the urea SCR system to perform the ammonia slip judgment process by the following procedures.

The ECU 40 in the urea SCR system as the exhaust gas purifying system according to the embodiment of the present invention is configured to judge the occurrence of ammonia slip based on the output of the NOx sensor 18 placed at the downstream side of the unit 13 having SCR catalyst when the urea water adding amount is limited or decreased. However, the scope of the present invention is not limited by this. For example, it is possible for the ECU 40 to have a structure to judge the occurrence of ammonia slip based on the output of the NOx sensor 18 when the urea water adding amount is increased. Further, it is also possible for the ECU 40 to judge the occurrence of ammonia slip based on the change of the NOx purifying rate following the change of the urea water adding amount.

Still further, it is possible for the ECU 40 to perform the judgment of the conditions (A) and (B) in step S24 and S25 shown in FIG. 6 after the urea water adding amount is limited.

Figure 7:
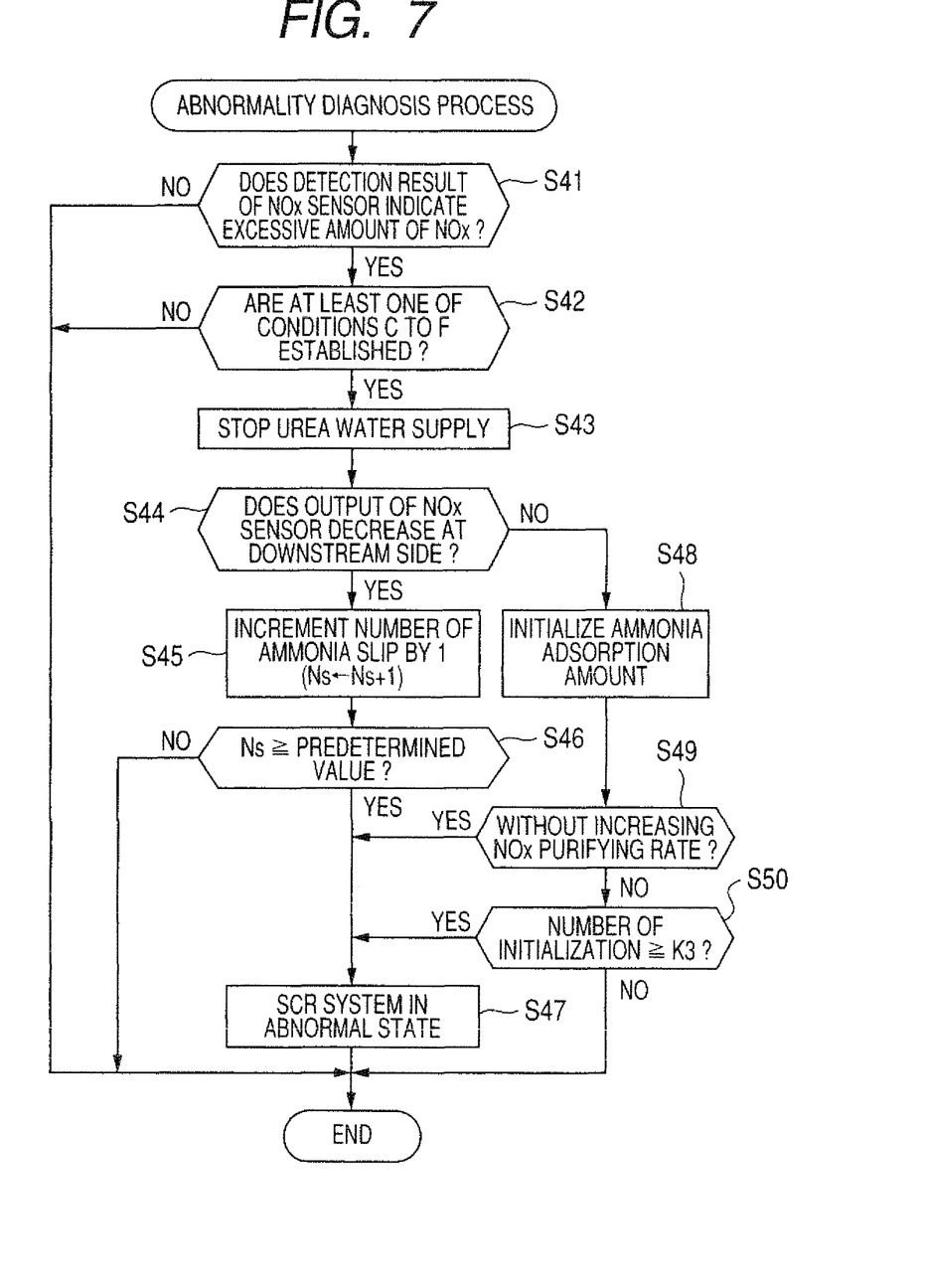
FIG. 7 is a flow chart showing a procedure to perform the abnormality diagnosis performed by the ECU as the exhaust gas purifying device in the urea SCR system according to another embodiment of the present invention.

FIG. 7 is a flow chart showing a procedure to perform the abnormality diagnosis as another embodiment of the urea SCR system, that is, the exhaust gas purifying system according to the present invention.

As shown in FIG. 7, the ECU 40 judges whether or not the NOx detection result of the NOx sensor 18 placed at the downstream side of the unit 13 having SCR catalyst indicates the presence of an excess amount of NOx in the exhaust gas (that is, the ECU 40 judges the First condition, previously explained).

When the NOx detection result of the NOx sensor 18 indicates the presence of an excess amount of NOx in the exhaust gas, that is, indicates the satisfaction of the first condition, the operation flow goes to step S42. In step S42, the ECU 40 judges whether at least one of the conditions (C) to (F) is satisfied or not.

When the judgment result in step S42 indicates that at least one of the conditions (C) to (F) is satisfied, the operation flow progresses to step S43. In step S43, the ECU 40 instructs the urea water adding valve 15 to stop the supply of urea water into the inside of the exhaust gas pipe 11. Then, the operation flow progresses to step S44.

In step S44, the ECU 40 monitors the change of the output of the NOx sensor 18 placed at the downstream side of the unit 13 having SCR catalyst.

When detecting the change of the output of the NOx sensor 18 in step S44, the ECU 40 performs the steps S45, S46, and S47 which are the same as the steps S13, S14, and S15 shown in FIG. 4.

On the other hand, when the ECU 40 does not detect any change of the output of the NOx sensor 18 in step S44, the operation flow progresses to step S48. In step S48, the ECU 40 performs the initialization for the ammonia adsorption amount. The operation flow then progresses to step S49. In steps S49 and S50, the ECU 40 judges whether the condition (A) or (B) is satisfied or not. When at least one of the judgment results in step S49 and S50 is YES, the ECU 40 judges the occurrence of abnormal state of the urea SCR system.

In step S12 shown in FIG. 4, when detecting whether or not the output of the NOx sensor 18 placed at the downstream side is decreased after stopping addition of the urea water into the inside of the exhaust gas pipe 11, the ECU 40 judges the occurrence of decreasing the output of the NOx sensor 18 based on an instantaneous output value of the NOx sensor 18. Instead of this, it is possible for the ECU 40 to judge whether or not the occurrence of decreasing the output of the NOx sensor 18 based on the output values during a predetermined diagnosis period of time counted after the addition of the urea water is stopped. Specifically, an integration value or an average value of the output values of the NOx sensor 18 during this predetermined diagnosis period of time may be used, and the ECU 40 judges the occurrence of decreasing the output of the NOx sensor 18 when the calculated result is not more than a judgment value. On the other hand, the ECU 40 judges there is no occurrence of decreasing the output of the NOx sensor 18 when the calculated result is more than a judgment value.

In the above case to use the predetermined diagnosis period of time in order to detect the occurrence of decreasing the output of the NOx sensor 18 placed at the downstream side of the unit 13 having SCR catalyst, the ECU 40 changes this predetermined diagnosis period according to the temperature of the SCR catalyst in the unit 13. Specifically, the more the temperature of the SCR catalyst is decreased, the more the predetermined diagnosis period of time is increased. This makes it possible to perform the abnormality diagnosis following the change of the responsibility of the NOx sensor 18, and it is thereby possible for the ECU 40 to suppress the occurrence of incorrect diagnosis.

The present invention is not limited to the manner to calculate the ammonia adsorption amount, and not limited to the method of initializing the ammonia adsorption amount. For example, it is possible to calculate a consumed amount of ammonia based on the amount of NOx contained in the exhaust gas emitted from the diesel engine and the actual NOx purifying rate of SCR catalyst in the unit 13, and to calculate the ammonia adsorption amount based on the consumed amount of ammonia and the urea water adding amount which is obtained when the consumed amount of ammonia is calculated. The ECU 40 performs initializing the ammonia adsorption amount by selecting the calculated ammonia adsorption amount as an initial value.

It is possible to apply the concept of the present invention to a system without the NOx sensor 16 placed at the upstream side of the unit 13 having SCR catalyst. In this structure, the NOx amount contained in the exhaust gas at the upstream side of the unit 13 having SCR catalyst can be calculated based on a rotation speed of the diesel engine and an air inlet amount to be introduced into the diesel engine.

It is possible to apply the concept of the present invention to systems other than the urea SCR system previously described, for example, to apply to:
- a system using solid urea for generating ammonia, and generating urea water or ammonia as reductant from the solid urea;
- a system using light oil to generate ammonia;
- a system to directly add ammonia into the inside of the exhaust gas pipe; and
- a system to use reductant (such as ITC) other than ammonia.

It is possible to apply the concept of the present invention as a urea water SCR system to gasoline engines, in particular, lean-burn gasoline engines.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An exhaust gas purifying device to be applied to an exhaust gas purifying system for an internal combustion engine,
the exhaust gas purifying system comprising:
an exhaust gas pipe through which an exhaust gas emitted from the internal combustion engine flows;
a unit having NOx catalyst placed in the exhaust gas pipe;
a NOx sensor placed at a downstream side of the unit having NOx catalyst; and
a reducing agent addition unit, placed at an upstream side of the unit having NOx catalyst, for adding reducing agent into the inside of the exhaust gas pipe, where the NOx catalyst in the unit adsorbs the reducing agent, and the reducing agent selectively purifies NOx contained in the exhaust gas,
the exhaust gas purifying device comprising:
a control unit configured to instruct the reducing agent addition unit to adjust an addition amount of the reducing agent, and configured to execute abnormality diagnosis on the basis of a detection result by the NOx sensor when the addition amount of the reducing agent is changed,
wherein the control unit is configured to execute the abnormality diagnosis when a first condition (a) and a second condition (b) are satisfied:
(a) the detection result of the NOx sensor indicates that the exhaust gas flowing in the exhaust gas pipe contains NOx which is not less than a predetermined value; and
(b) there is no abnormality caused by the reducing agent adsorbed to the NOx catalyst,
wherein the control unit is further configured to calculate an adsorption amount of the reducing agent on the NOx catalyst on the basis of series data of a difference between an addition amount of the reducing agent added to the NOx catalyst by the reducing agent addition unit and an amount of the reducing agent consumed by the reduction reaction using the NOx catalyst; and
the control unit is configured to initialize the adsorption amount of the reducing agent to the NOx catalyst, and
wherein the second condition (b) is one of the following conditions (b-1) and (b-2):
(b-1) no NOx purifying rate is increased even if the control unit initializes the adsorption amount of the reducing agent; and
(b-2) there are cases of not less than predetermined times, in which the NOx purifying rate is increased when the adsorption amount of the reducing agent is initialized.

2. The exhaust gas purifying device according to claim 1, wherein the second condition (b) is a condition in which an amount of NOx contained in the exhaust gas at the upstream side of the unit having the NOx catalyst is equal to zero or equal to zero.

3. The exhaust gas purifying device according to claim 1, wherein the second condition (b) is a condition in which a temperature of the NOx catalyst is within a predetermined high temperature range.

4. The exhaust gas purifying device according to claim 1, wherein
the control unit is configured to detect an abnormal state of the NOx sensor when one of the following conditions (b-3) and (b-4) is satisfied:
(b-3) an amount of NOx at the downstream side of the unit having the NOx catalyst calculated on the basis of a detection signal of the NOx sensor is equal to zero; and
(b-4) the NOx purifying rate calculated on the basis of the detection signal of the NOx sensor is equal to 100%.

5. The exhaust gas purifying device according to claim 1, wherein the control unit is configured to detect the abnormal state of the NOx sensor during a predetermined period which is a predetermined period counted from a time when the addition amount of the reducing agent is changed, and the control unit is configured to detect the abnormal state of the NOx sensor on the basis of the detection result of the NOx sensor at a plurality of timings during the predetermined period.

6. The exhaust gas purifying device according to claim 5, wherein the control unit is configured to adjust the predetermined period on the basis of a temperature of the NOx catalyst in the unit in order to detect occurrence of the abnormal state of the NOx sensor.

\* \* \* \* \*